Oct. 4, 1955 J. E. DEZELL 2,719,513
ROTARY ENGINE
Filed March 15, 1951 3 Sheets-Sheet 2

INVENTOR.
J. Elton Dezell
BY George H. Baldwin
ATTORNEY

Oct. 4, 1955 J. E. DEZELL 2,719,513
ROTARY ENGINE

Filed March 15, 1951 3 Sheets-Sheet 3

INVENTOR.
J. ELTON DEZELL
BY George H. Baldwin
ATTORNEY

United States Patent Office 2,719,513
Patented Oct. 4, 1955

2,719,513

ROTARY ENGINE

James Elton Dezell, Atlantic Beach, Fla.

Application March 15, 1951, Serial No. 215,731

6 Claims. (Cl. 123—13)

My invention relates to rotary engines.

A general object of my invention is to provide an improved rotary engine of high efficiency and simple construction.

A more particular object is to provide a simple and effective rotary valve arrangement through which the pistons of a rotary engine may pass.

A further specific object is to provide, in a rotary engine, a valve arranged effectively to seal a chamber portion behind a piston member immediately the trailing face of such piston member starts to enter into said portion, or to seal a chamber portion in front of a piston until the leading face of such piston has substantially completely left said portion.

Another specific object of my invention is to provide a rotary engine in which the combustion of an explosive mixture takes place at maximum compression, and in which expansion of the combustion products is entirely utilized to drive the pistons and expansion products are not wasted in filling waste space.

Rotary engines have been heretofore suggested but have proved impractical for two primary reasons, first, because they have been of complicated construction, and secondly, because the expanding gases resulting from an explosion have been forced to fill waste spaces and have not been entirely utilized in driving the pistons, or the expansion of the compressed explosive mixture into such waste spaces has been permitted to occur prior to the combustion, thereby reducing the, so-called, compression ratio.

It is, accordingly, a general object of the invention to provide a rotary engine not subject to these drawbacks.

Figure 1:
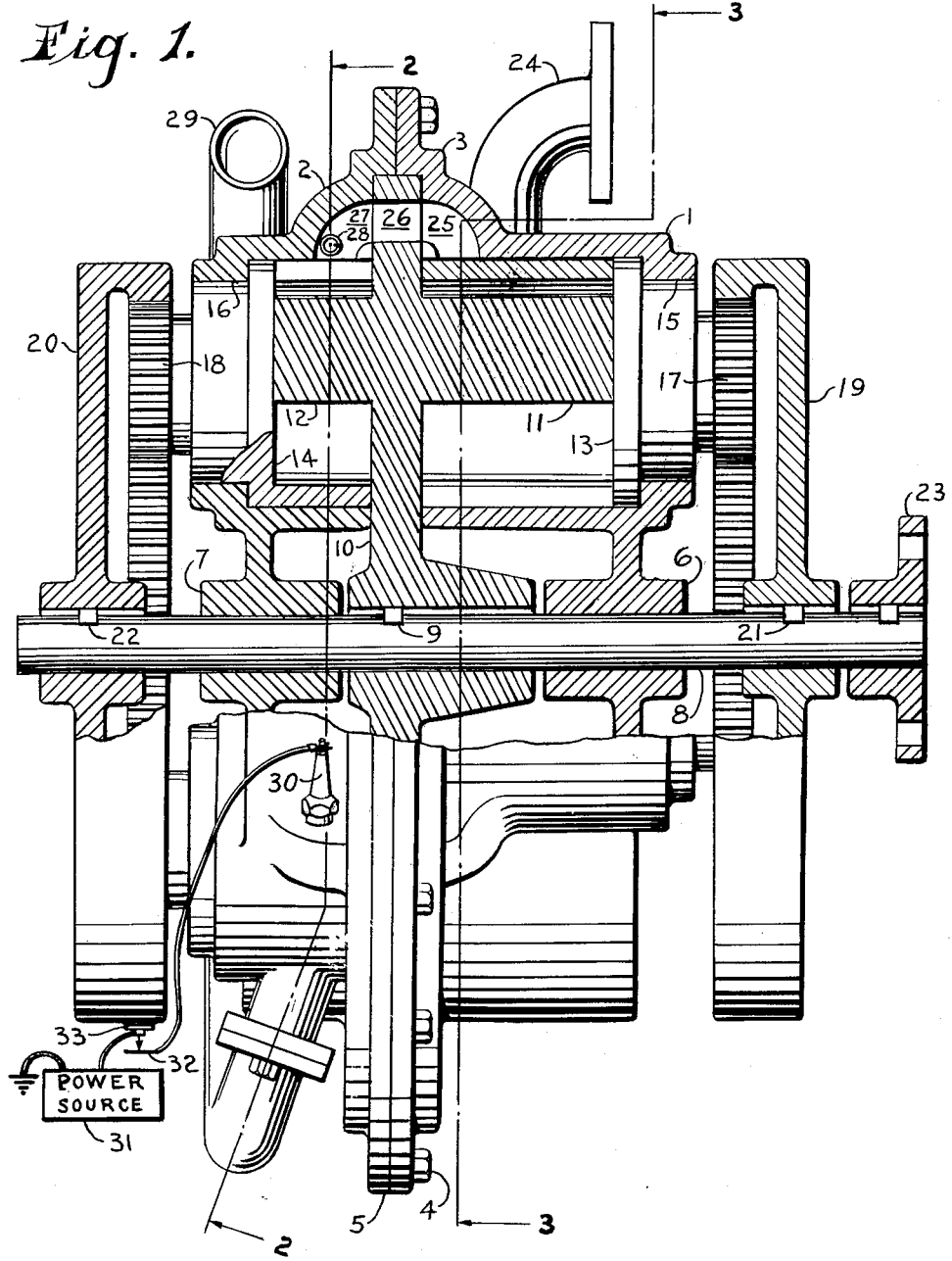
Figure 2:
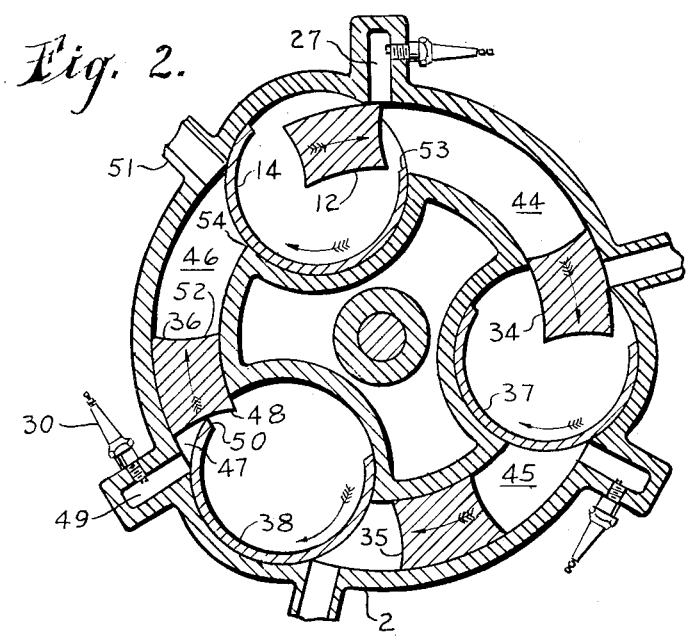
Figure 3:
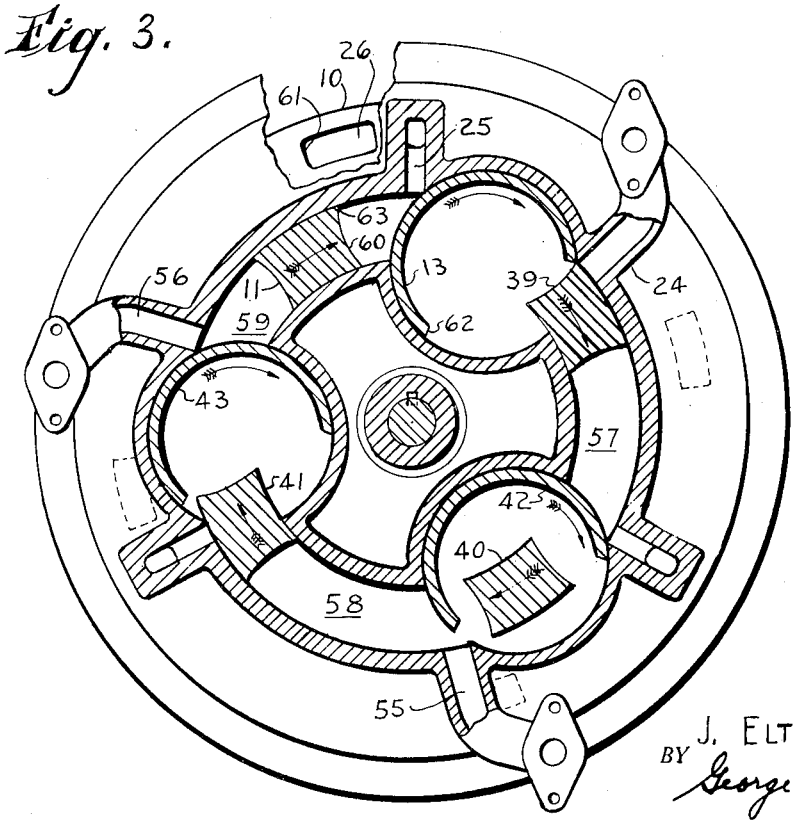
Figure 4:
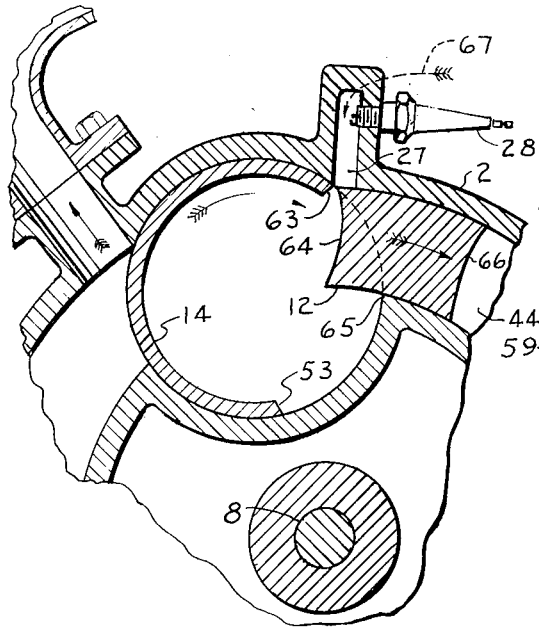
Figure 5:
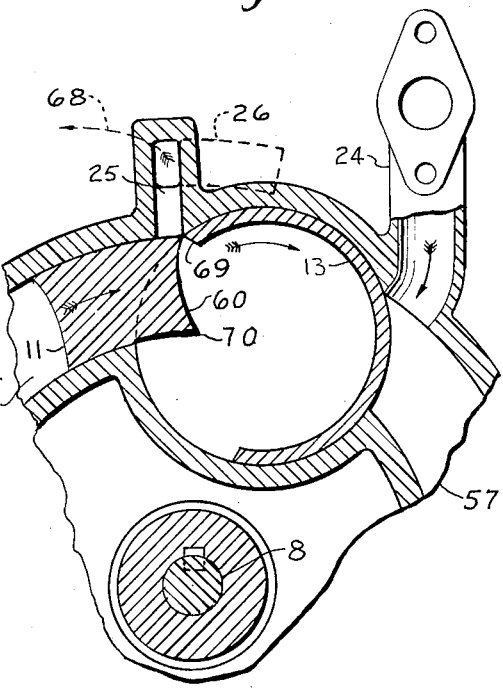
Figure 6:
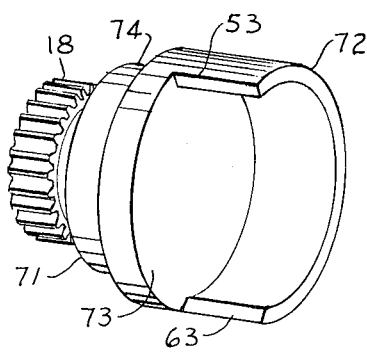

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 is a partially cut away side view of a rotary engine in accord with my invention; Fig. 2 is a sectional view taken along the line 2—2 of Fig. 1, showing the power side of the engine; Fig. 3 is a sectional view taken along the line 3—3 of Fig. 1, showing the compression side of the engine; Fig. 4 is a detail view of a portion of the section of Fig. 2 taken at a different rotative position of the engine rotor; and Fig. 5 is a detail view of a portion of a section of Fig. 3 taken at the rotor position of Fig. 4, each of Figs. 4 and 5 being taken at the position corresponding to the moment at which explosion occurs in one segment of the engine; and Fig. 6 is a detail perspective view of a valve for the engine in accord with my invention.

Fig. 1 of the drawings shows a rotary engine in accord with the invention comprising a frame 1 formed of two castings, casting 2 being the power side casting and casting 3 the compression side casting. The castings are held together by bolts 4 at peripheral flange portions 5.

Bearings 6 and 7 support a shaft 8, to which is keyed, by a key 9, flywheel disc 10. Four compression piston members, such as piston 11, protrude for one flat face of the flywheel 10 toward the compression side, while four power pistons, such as piston 12, protrude from the opposite face. Cylindrical rotary valves 13 and 14 cooperate with the pistons, the valves being arranged for rotation about their cylindrical axes in bearings 15 and 16, respectively. The outer ends of the valves are formed as spur gears 17 and 18 which are driven from corresponding internally toothed ring gear wheels 19 and 20, these wheels being keyed by keys 21 and 22, respectively, to the shaft 8. A suitable coupling member 23 is keyed to the shaft external to the gear 19 for coupling the engine to a mechanism to be driven. An intake manifold 24 is arranged to supply air, or a mixture of air and vaporized fuel, to the compression side of the engine, therein to be compressed by pistons 11, with rotation of shaft 8, and to be forced into a restricted chamber. This chamber consists of a channel 25 in the compression casting 3, a port 26 near the periphery of the flywheel 10, and a channel 27 in the power casting 2. Rotation of the flywheel beyond the position indicated in Fig. 1 will be seen hereinafter to remove the port 26 from communication with channels 25 and 27 and to form channel 27 into an explosion or combustion chamber of which one end is closed by a solid portion of the flywheel and of which the opposite lower end opens into a restricted expansion chamber to drive power pistons 12 in a circular path about the shaft 8. The confined compressed explosive mixture in chamber 27 is exploded by a spark plug 28. Combustion products after expansion are exhausted through a suitable exhaust manifold 29 as hereinafter further explained.

Spark plug 28, together with additional spark plugs 30, are fired from suitable power sources 31 acting through a distributor which may comprise simply a switch 32 for each plug actuated by a cam 33 forming part of a gear 20, although any other desired method of providing timed firing power to the spark plugs may be employed.

As shown in Fig. 1, the ends of the pistons 11 and 12 remote from the flywheel are flat and lie in planes parallel to the face of the flywheel, and the ends further are seen to lie against flat facing portions of the valves 13 and 14, respectively. This arrangement is not necessary, in that the piston ends may be rounded so as to conform, for example, to a portion of the surface of a torus having an axis along the axis of shaft 8. It is further not necessary in any case that the piston ends lie against the flat valve faces, although it may be desirable that they be in contact therewith.

The sectional view of Fig. 2 shows the four identical power pistons 12, 34, 35, and 36, and the three identical power side valves 14, 37, and 38 all in correct relative positions at one instant during operation, and Fig. 3 shows at the same instant the positions of compression pistons 11, 39, 40, and 41 and valves 13, 42, and 43 in correct positions relative to each other and to the pistons and valves of Fig. 2. It will be understood that each piston 11, 39, 40, and 41 is identical to compression piston 11, and that each valve 13, 42, and 43 is identical to valve 13, of Fig. 1. The piston 11 and valve 13, and the piston 12 and valve 14, are shown in Fig. 1 slightly displaced about the shaft 8 from their actual relative positions the better to illustrate the overall concept of the machine, while Figs. 2 and 3 demonstrate the alignment of pistons and valves in accurate and proper relative positions, at a selected instant, for the best operation of the engine.

The power side casting 2, as seen in Fig. 2, is formed with an annular expansion chamber divided by the valves into arcuate segments 44, 45, and 46 through which each piston passes sequentially. The annular expansion chamber is generally rectangular in cross section to conform to the shape of the pistons, as seen in Fig. 1, although if the pistons have rounded ends as suggested above, the far wall of the chamber, that is, the wall facing the viewer in Fig. 2, will be correspondingly concave. The valves 14, 37, and 38 are formed with a round and flat faced base portion, the face being preferably disposed flush with the far wall of the expansion chamber, and from the face of the base portion there extends a hollow cylindrical skirt portion partially cut away to form a side opening to admit the approaching piston into the interior of the hollow portion and later to permit departure of the piston from the interior of the hollow portion into the next segment of the annular chamber. The skirt portion thus comprises a hollow cylindrical valve member having a side open to permit passage of the pistons sequentially through the valve.

It may assist in understanding the arrangement of Figs. 2 and 3 to notice the general shape of the valve employed, which is shown in Fig. 6. A detailed description of the valve member is given hereinafter.

With further reference to Fig. 2, piston member 36 is being driven in a clockwise direction by expanding gases trapped in the volume 47 which exert pressure against a portion of the trailing piston face 48, and thereby cause the main shaft 8 to turn. The ignition or explosion of the charge that resulted in these expanding gases would have occurred shortly prior to the moment piston 36 had reached the position of Fig. 2, while the volume 47 was of minimum size. Sparkplug 30 is so arranged as to have initiated the explosion in the explosion chamber 49 just as this chamber was sealed by closing of the corresponding flywheel port and just as the piston 36 started to uncover the inner end of the explosion chamber. At this moment the leading edge 50 of the skirt of valve 38 had just reached the trailing face 48 of piston 36 and had started to follow the face from the outer edge to the inner edge. The exploding gases are thus trapped and expand only as the piston moves in its clockwise orbit in segment 46 of the annular power chamber.

The valve 38, and each of the other valves of both the power and compression sides, revolves clockwise four times for each clockwise rotation of the flywheel. During each revolution of each valve, a piston enters through the cut away portion, or open side, of the valve skirt into the interior, passes therethrough, and emerges, again through the cut away portion, into the annular chamber.

Piston 36, in passing through segment 46, pushes exhaust gases resulting from a previous explosion in front of it out through the exhaust passage 51 which couples with the exhaust manifold shown at 29 in Fig. 1. The arrangement is such that as the leading face 52 of piston 36 reaches valve 14, the trailing edge 53 of the skirt of valve 14 will have just reached the shoulder 54 at the far end of the inner wall of chamber segment 46. At this instant, the innermost edge of face 52 will have just arrived at the shoulder 54, and thereafter as valve 14 revolves clockwise, and as piston 36 advances in its clockwise rotation about the axis of shaft 8, edge 53 follows face 52 across the chamber toward the entrance to passage 51. A diminishing, generally triangular volume remains which is open into passage 51 until this volume disappears as piston 36 covers the opening into passage 51. Substantially all of the exhaust gases in segment 46 will have thus been forced out and none are carried forward into the interior of valve 14.

It is to be noticed that the leading face of each piston, such as face 52 of piston 36, is contacted by the trailing edge of the skirt portion of each valve, such as edge 53 of valve 14, as the piston completes its passage through a segment and is entering the interior of the valve skirt. The leading edge of the valve skirt, such as edge 50 of valve 38, similarly contacts the trailing face of each piston, such as face 48 of piston 36, as the piston leaves the valve. However, the trailing face of a piston is not contacted on entering the interior of a valve, nor is the leading face contacted as the piston leaves the interior of the valve.

Fig. 3, which is a sectional view of the compression side of the engine, shows, in addition to compression pistons 11, 39, 40, and 41 and revolving valves 13, 42, and 43, three intake manifold passages or tubes 24, 55, and 56 each arranged to supply air, or an explosive mixture such as gasoline vapor and air, to a respective one of the three segments as 57, 58, and 59 of the annular compression chamber.

As the pistons rotate in a clockwise direction about the axis of shaft 8 through the successive segments, explosive mixture is sucked into each segment behind one piston and is compressed therein in front of the next piston. Thus piston 11 is compressing a charge of explosive mixture in the space between its leading face 60 and the skirt of valve 13, and this compressed charge is entering channel 25, from which it will be admitted through flywheel port 26, of flywheel 10, into the corresponding channel or explosion chamber 27 in Figs. 1 and 2. The space in which the mixture is confined becomes progressively smaller until port 26 aligns with channel 25. At this time the mixture expands to fill the volume of the port and the explosion or combustion chamber 27 of the power side, but thereafter further rotation of the piston reduces the volume until a minimum volume is reached just as the trailing edge 61 of port 26 seals off channel 25 and chamber 27 and, simultaneously, the trailing edge 62 of the skirt of valve 13 has just reached the outer edge 63 of piston face 60 across which it has traveled.

Since the compression space within segment 59 in front of the piston 11 diminishes to substantially zero just as the edge 61 of flywheel port closes off the channel 25, substantially maximum compression exists in the combustion chamber 27, of Fig. 2, at this moment. The engine is preferably timed to initiate explosion in each explosion chamber of the power side each time this condition is reached and just at the moment of maximum compression.

Some of the compressed charge will remain in flywheel port 26 and in compression channel 25 after the explosion chamber 27 is sealed by the flywheel. These trapped portions of compressed charge are not lost, of course, but the portion in channel 25 will empty back into segment 59 in front of the next compression piston as it starts its compression stroke, and the portion trapped in the port 26 will be carried forward and added to the charge to be compressed by piston 11 in the next chamber segment 57. By making the outer portion of the flywheel thin, and by limiting the size of the port and channel 25 as much as possible without unreasonably restricting the flow of mixture to the explosion chambers, the volume of trapped compressed charge thus recirculated may be minimized.

Turning now to Figs. 4 and 5, which are detail views taken along sections similar to those identified by lines 2—2 and 3—3, respectively, of Fig. 1, the relationship of the parts in a portion of the power side and in a portion of the compression side are readily understood. The positions of power piston 12 and a cooperating valve 14 are shown in relation to the positions of the compression piston 11 and a cooperating valve 13 at the same upper portion of the engine just as maximum compression is reached and as combustion occurs, or is about to occur. In Fig. 4, the power piston 12 is shown just as the leading edge 63 of the skirt of valve 14 makes contact with the outer edge of the trailing face 64 of the piston. The explosion chamber 27 confines a compressed mixture of gasoline vapor and air, and the mixture may be exploded at this instant by means of sparkplug 28.

The curve of face 64 is such that the leading edge 63 of the valve will follow and make contact with this face of the piston until the leading edge 63 reaches the shoulder 65 formed between the portions of the casting 2 which comprise the cylindrical valve chamber and the segment 44. Thereafter, the valve skirt forms a rear wall for segment 44 behind the clockwise rotating piston.

The pistons rotate clockwise about the axis of shaft 8 at a rate one-quarter that of the rate of clockwise revolution of each valve about its cylindrical axis, there being four pistons on each side of the flywheel, and one piston passes through each valve for each revolution of the valve. Accordingly, there are four times as many teeth on the ring gear wheel as there are on each valve gear cooperating therewith. In order that the proper shapes for the leading and trailing faces of the pistons may be obtained it is convenient to assume that the flywheel, shaft and pistons are stationary and that the frame and valves rotate as a unit about the shaft on the main bearings in a counterclockwise direction. The axis of a valve would then rotate counterclockwise about the shaft once while a part of the valve, such as a leading or trailing edge, would revolve four times clockwise about the valve axis. The curve traced by a leading, or trailing, edge of a valve under these conditions would be a curtate hypocycloid of four cusps and, if R represents the radial distance from the shaft axis to a valve axis, $r$ represents the radial distance from the valve axis to the leading, or trailing, edge, and $\theta$ represents the angle of displacement of the frame from a predetermined coordinate axis, this curve may be represented by the mathematical expression:

$$x = R \cos \theta + r \cos 3\theta$$
$$y = R \sin \theta - r \sin 3\theta$$

An appropriate portion of this curve is selected for the leading face of the power and compression pistons, and another portion for the trailing faces. The portions selected should lie between points on the curve which are, respectively, the same distances from the center $$(x=0, y=0)$$

of the curve as the inner and outer edges of the piston are from the axis of shaft 8. For a leading piston face, the appropriate portion of the curve will fall within $\theta = 45$ degrees and $\theta = 90$ degrees, while the appropriate portion of the curve for a trailing piston face will fall within $\theta = 0$ degrees and $\theta = 45$ degrees. If $R = 2r$, as an example, which is approximately the proportion of the illustrated embodiment, and if the inner edge of the piston falls at a distance slightly less than R from the shaft axis, while the outer edge falls a little less than $R + r$ from the shaft axis, a leading face may take the form of the curve from $\theta = 64$ degrees to $\theta = 86$ degrees and the trailing face may take the form thereof from $\theta = 4$ degrees to $\theta = 26$ degrees, these portions being exemplary only and subject to being determined by the exact radial distances to the inner and outer edges of the valves.

In Fig. 4, accordingly, the trailing face 64 and leading face 66 of piston 12 are shaped in accord with respective portions of the curve represented by the above mathematical expression. It will be understood that the shapes referred to are shapes in a plane perpendicular to the axis of shaft 8, while the faces are straight in the direction parallel to the axis of shaft 8.

At the moment illustrated in Fig. 4, a compressed explosive mixture has been supplied to the explosion chamber 27 and this chamber sealed by the flywheel body portion near the flywheel port. The dotted arrow 67 indicates in conventional manner the passage of compressed mixture into chamber 27 as the compressed mixture was supplied from the compression side of the engine through a flywheel port. The mixture is furnished directly to chamber 27 from the port as readily understood from Fig. 1.

Just as the chamber 27 is sealed, at the moment illustrated in Fig. 4, the leading edge 63 of the skirt of valve 14 is making contact with the trailing face 64 of the piston 12 at its outer edge. As the piston and valve rotate clockwise from this position, the edge 63 will traverse the face 64 from the outer to the inner edge of the face, remaining in contact throughout, until the leading edge reaches the shoulder 65. Thereafter the end of chamber 44 remains sealed by the valve skirt as the exploded and expanding gases press against face 64 to drive piston 12 clockwise.

Fig. 5 shows the position of compression piston 11, valve 13 and flywheel port 26 at the moment corresponding to that illustrated for the power piston 12 in Fig. 4. At this moment, piston 11 has just completed compression of a charge in chamber segment 59. This charge was compressed ahead of the leading face 60 of piston 11 and substantially all of the charge has been forced into the compression channel 25. At the moment illustrated the charge is divided into three sealed volumes, the volume of channel 25, the volume of the flywheel port 26, and the volume of the combustion chamber 27, as shown in Figs. 1 and 4. Arrow 68, shown in dotted lines, as in Fig. 4, indicates the direction of transfer of the compressed explosive mixture from the compression channel 25 through the port to the explosion chamber.

The trailing edge 69 of the valve skirt has reached the position at the outer edge of piston face 60, after having traveled across this face from the inner edge 70 at which contact between the edge 69 and face 60 was first established. The face 60 is straight in the direction perpendicular to the plane of the drawing, as are all of the piston leading and trailing faces, and is curved to conform to the cycloidal curve as heretofore described. If the dimensions of the compression side of the engine are the same as those of the power side, for all dimensions measured in a plane perpendicular to the axis of shaft 8, as they are shown to be in the herein described embodiment, the curve of the leading face 60 of each compression piston will be the same as the curve for the leading face of each power piston, and the same will be true for the respective trailing faces. The pistons and valves may, however, differ in the depth dimension taken parallel to the axis of shaft 8. Fig. 1 suggests, for example, that the compression pistons may be approximately twice the depth of the power pistons; that is, they may extend twice as far from the flywheel face. It is possible by properly relating the sizes of the compression and power pistons, accordingly, to obtain any desired ratio between the original volume of each charge and the volume occupied by the charge after explosion and expansion in the power side. The sizes of pistons suggested by the drawings would provide for the compression of an explosive mixture, or the air component of such mixture, of a predetermined volume, in accord with the volume of a compression side chamber segment, into a volume determined by the volume of the compression channel, flywheel port and explosion chamber, and the subsequent expansion, after explosion, of the portion of this original charge which was sealed in the explosion chamber to a volume substantially equal to the volume of a power side chamber segment. The ratio should be selected to provide the most efficient operation for the temperatures, type of fuel, percentage of oxygen in the air, and similar factors to be considered dependent upon the specific use of the engine.

Other dimensions of the compression pistons and power pistons may be different, one from the other, of course, though it may then be necessary to utilize valves of different diameters or with different size openings in the skirts for the respective sides of the engine. While the power and compression pistons are shown to be at equal distances from the shaft, it may be desirable to arrange either the power pistons or compression pistons closer to the shaft than the other set. Such changes and modifications may be made as desired, as will be apparent to those skilled in the art, though it is believed that for ordinary conditions, and for most economical manufacture, the valves of the two sides should have the same diameters and should be equally spaced from the shaft 8.

Figure 5 further shows for comparison with the other figures, the intake manifold connecting conduit 24, through which uncompressed mixture is drawn into segment 57 behind an advancing piston, and other parts of the engine bearing reference numerals as heretofore described in connection with such other figures.

Fig. 6 is a detail view of a valve in accord with the invention after which both the power side and compression side valves are patterned. This valve may be the power side valve designated 14 in Figs. 1, 2 and 4, for example, and comprises a spur gear portion 18, a base portion designated generally at 71, and a skirt portion 72. The skirt portion is of hollow cylindrical shape having an open side bounded by straight leading and trailing edges, 63 and 53, respectively. These two edges are parallel to the cylindrical axis of the valve. At each edge 53 and 63 the skirt is preferably bevelled to prevent interference with the pistons, the bevel being so arranged as to reduce the angle forming the edges 53 and 63, respectively, to less than a 90 degree angle.

The skirt portion of the valve extends from a flat face 73 of the body portion, and the body further comprises a cylindrical journal surface 74, which is held for rotation in a bearing in the engine frame, such as bearing 16 of Fig. 1.

Referring now to Figs. 1 and 6, it will be seen that the valve 14 is held in place in casting 2 of the frame against movement in an axial direction by contact of the skirt portion with the surface of the flywheel 10, in one direction, and by contact between a portion of the engine frame near bearing 16, and the shoulder formed on the valve body portion between journal surface 74 and the adjacent back or underside of the face 73. As an alternative to or modification of these means of holding the valve against axial movement, a detachable collar can be fitted about the valve between the gear portion and the outside of the engine frame. This collar may bear against the frame, at the outer end of bearing 16, for example, to prevent the valve from moving toward the flywheel and less wear of the parts may occur if a collar is provided in this manner.

The valves are arranged in the desired manner in their respective bores in the frame members 2 and 3 prior to bolting the frame members together, and to facilitate proper relative rotative positioning of the valves and flywheel, timing marks are preferably applied to the gear wheels 19 and 20, or one of them, and to each valve gear such as 17 and 18. When properly aligned, it will be possible to slide flywheel 10 into position with the pistons entering the channel and valves of one casting, and thereafter the other frame member or casting may be moved along shaft 8 into proper position. It will be found convenient to thus assemble the frame before the gear wheels 19 and 20 are placed in position on the shaft 8, making sure that all timing marks are properly aligned prior to keying the gear wheels in position. Conversely, to disassemble the engine, the gear wheels 19 and 20 are first removed. If it is desired to reach or examine parts in only the compression or power side, of course, only the appropriate one of the gear wheels need be removed. Under circumstances when it may be desirable to do so, one gear wheel may be affixed first to the shaft, and may remain fixed during any assembly or disassembly if it is preferred to affix and remove the flywheel on the shaft instead.

It is understood that the engine frame may include suitable mounting means of any desired type, and that various auxiliary apparatus may also be provided, such as fuel pumps, electric generators or the like. It may be desired also to provide suitable passages for a liquid cooling medium through one or both sides of the engine as required, or to provide air cooling fins. It is also necessary to furnish lubrication to the wearing surfaces of the engine, such as by supplying a small quantity of lubricant with the fuel, or by forcing oil into bearings and against bearing surfaces, or both. A carburetor may be employed to furnish an explosive mixture to the intake manifold and thence to intake connections 24. Alternatively, fuel injection apparatus may be employed to inject a petroleum product directly into the explosion chambers or into the compressor chamber segments. Such auxiliary apparatus and carburetion or injection equipment is known for internal combustion engines, and such equipment and apparatus forms no part, per se, of my invention.

The preferred illustrated embodiment of my invention comprises an engine having four pistons and three valves. In operation, there will be twelve explosions per shaft revolution, and since these explosions occur at different times, that is, one explosion for each 30 degrees of shaft rotation, and since the driving force of each explosion lasts for about 55 degrees of shaft rotation, the flow of power produced is smooth and even. One additional factor contributing to the smoothness of operation lies in the fact that the force of an explosion becomes only gradually effective against the piston in that it is applied to only the outermost portion of the piston face at first, and thereafter an increasing area of the face is exposed to the expanding gases by the moving leading edge of the valve skirt.

It is to be noted that an uneven number of valves and even number of pistons, or vice versa, permit explosions to occur at equal intervals throughout a flywheel revolution, the total number of such explosions, for each rotation of the flywheel, being the product of the number of pistons and the number of valves. It is preferable that the number of valves should be one less than the number of pistons, and the combination of three valves and four pistons presents advantages over greater or less numbers. Twelve explosions per revolution are sufficient to provide an even power flow at rates ranging from one or two hundred to a few thousand revolutions per minute. If sustained operation at less than about five hundred or one thousand revolutions per minute is contemplated, however, and if overall engine size is less important than smoothness of operation, it may be desirable to increase to four valves and five pistons. In such an engine the leading and trailing piston faces would be in accord with the hypocycloid of the expression:

$$x = R \cos \theta + r \cos 4\theta$$
$$y = R \sin \theta - r \sin 4\theta$$

On the other hand a somewhat less expensive engine of smaller overall size may be constructed with two valves and three pistons, to give six explosions per revolution, and such an engine would be practicable for high speed operation. In an engine so constructed, the leading and trailing piston faces should conform to parts of the curtate hypocycloid of three cusps expressed mathematically as:

$$X = R \cos \theta + r \cos 2\theta$$
$$Y = R \sin \theta - r \sin 2\theta$$

In any such construction, it will be understood that each compression piston reaches the end of its stroke, or passage through a chamber segment, just as the flywheel port closes, and that explosion in the explosion chamber occurs substantially at this moment in engines of my relatively simple construction. It is thus possible to explode the charge at, or substantially at, maximum compression. In practice, it may be preferred so to relate and time the parts that the compression piston complete its stroke just before the flywheel port seals the explosion chamber. It may also be desirable in practice to have the port pass the explosion chamber to seal it just before the power side valve skirt leading edge reaches the power side piston face. Ignition of the charge in the explosion chamber may then occur just after the chamber is sealed at the flywheel and just before it is opened by passage of the outermost edge of the trailing face of the power piston into the power side chamber segment. Such modifications of the timing relationships are considered to be within the range which may be defined as substantially simultaneously, and this range might include a period from the moment when the compression valve leaves the leading face of a compression piston to the moment when the leading edge of the corresponding power side valve first makes contact with the trailing face of the corresponding power piston equal to as much as two or three degrees of flywheel rotation.

As mentioned hereinabove, the piston ends remote from the flywheel need not be flat and parallel to the flywheel. In some cases it will be found desirable, for example, to provide strips of metal in the surfaces of the pistons to prevent escape of explosion products or exhaust gases past the power pistons, and escape of the compressed air or air and fuel mixture past the compression pistons. These strips would be in the nature of piston rings as commonly employed in reciprocating piston engines and pumps. To facilitate the use of such strips the ends of the pistons remote from the flywheel may be rounded whereby the piston 11 as seen in cross section in Fig. 1 would have a semicircular right-hand end tangent to the valve face. The portion of the compression chamber furthest from the flywheel should then be rounded, to conform to the surface of one half of a toroid. Semicircular strips may then be set in such rounded ends of the pistons and straight strips may be set in the inner and outer faces of the pistons parallel to the axis of shaft 8. Alternatively, U-shaped strips may be provided of which the straight portions will extend along the respective inner and outer surfaces of a piston, while the rounded portion will lie in the similarly rounded piston end portion. The forward edges of the strips for the power pistons may be beveled slightly to insure against catching as the piston leaves a valve and enters a chamber segment, and the shoulders at the juncture of the chamber segments and valve bores in the compression side may be beveled to prevent catching of the strips of the compression pistons as they enter the chamber segments. Thus the forward edge of the strips of compression pistons will be sharp to prevent escape of compressed air or mixture, and the trailing or back edge of the strips of power pistons are sharp to prevent escape of the expanding explosion products.

The valves of the engine according to the invention as illustrated by the disclosed embodiment are arranged to rotate about axes placed in the piston path. It is desirable to have valves of small diameter to increase the distances in which power is applied. The smaller the valves, the greater is the length of the segments of the annular chamber. It is further desirable that the pistons be as large as possible in the direction radially from the shaft 8, from the inner surface to the outer surface, but it is also necessary that each piston pass into the interior of a valve between strokes. The piston, on the other hand, cannot be too short, from leading to trailing face, because of strength considerations and in order to form a satisfactory seal in the chamber. In view of these several desirable conditions, it has been found important that the leading and trailing edges of the valve skirts travel across the respective piston faces as rapidly as possible. To this end, the piston face is presented to the respective skirt edge as the edge is approaching its maximum rate of travel in the direction toward or away from the shaft 8, and the edge leaves the piston face shortly after the maximum rate is passed. The result is that the pistons can be almost rectangular or square, in the view of Figs. 2 and 3, and the valve can be relatively much smaller than for pistons adapted to pass through other portions of the valve. The pistons of the preferred arrangement have leading and trailing faces that depart only very little from a radial plane constructed from the shaft axis. If the pistons passed through the portion of the valve furthest from the shaft, the faces would have long overhanging portions extending almost at right angles from a radial plane so constructed, or if the pistons passed through the valve at the innermost portion, nearer the shaft, the faces would have long underhanging protruding portions. In either case, the valve would have to be unnecessarily great in diameter to accommodate the overall piston length as measured between the tips of the leading and trailing faces of the piston.

By not permitting any part of the explosive force to be exerted within the valves, and because of the several mechanical features of the invention, the charge is exploded at maximum compression and no part of the explosion products are wasted in merely filling space. By arranging the valves to contact the piston faces as described, effective driving force is being applied to each piston during a high percentage of its traversal of its annular path. These features of the engine according to my invention are important to obviate shortcomings of rotary engines heretofore suggested, and it is particularly to be noted that the desired features of operation are accomplished without the necessity of complicated construction.

While I have shown only certain preferred embodiments of my invention by way of illustration, many modifications will occur to those skilled in the art, and I therefore wish to have it understood that I intend, in the appended claims, to cover all such modifications as fall within the true spirit and scope of my invention.

What I claim as new and desire to secure by Letters Patent of the United States is:

1. In a rotary engine, a plurality of like piston members, an annular chamber for traversal in a predetermined direction by said piston members, a rotary valve having a hollow cylindrical skirt portion for rotation in the same direction so as said predetermined direction on its cylindrical axis, said portion having a rectangular side opening, the hollow interior of said portion being large enough and so positioned as to periodically receive one said piston member completely therein, means to rotate said valve in timed relation to said traversal by said piston members of said chamber to dispose said side opening to pass said piston members in sequence into and out of said interior, said skirt portion having a bounding edge at said side opening, each said piston member having a face, said edge tracing a portion of a curtate hypocycloid as said edge moves across each said face, and each said face conforming to said traced curtate hypocycloid portion.

2. In a rotary engine comprising a flywheel having a flat face portion, and a frame member forming an annular chamber open toward said face portion, a valve having a hollow cylindrical skirt portion to extend across said chamber with the cylindrical axis of said skirt portion normal to said face portion of said flywheel, a plurality of pistons spaced equally on said face portion of said flywheel and adapted and arranged to traverse said annular chamber with rotation of said flywheel, said valve skirt portion having a rectangular opening to permit individual pistons sequentially to enter and leave the interior of said skirt portion, means to rotate said valve in the same direction as the direction of rotation of said flywheel once for each said piston for each rotation of said flywheel, said means being timed to move said leading edge across said chamber as the trailing portion of each said piston leaves said skirt portion, said trailing portions of said pistons being shaped in accord with a portion of a curtate hypocycloid having a number of cusps equal to the number of said pistons and so proportioned that said leading edge is in constant contact with the trailing face of the leaving piston during said travel of said leading edge across said chamber.

3. In a rotary engine comprising an annular chamber subdivided by three equidistantly spaced identical rotary valves, each said valve comprising a hollow, cylindrical, open-sided portion disposed in said chamber, four piston members to traverse said chamber and pass successively into and out of said portion of each said valve in continuous sequence through said open sides thereof, means to rotate each said valve through 360 degrees about its respective cylindrical axis in the direction of rotation corresponding to the direction of travel of said piston members in said chamber four times for each complete traverse of said chamber by one said piston member, each said piston member having leading and trailing faces shaped in accord with portions of a curve plotted from the expression $$x = R \cos \theta + r \cos 3\theta$$
$$y = R \sin \theta - r \sin 3\theta$$

where R is the distance from the axis of said annular chamber to one said valve axis, r is the radius of each valve, and the angle $\theta$ is measured from an $x$ axis selected in the plane of said piston members, the width of said side opening and the length between said faces of each said piston member being proportioned to cause said leading face of each piston to be contactingly followed by the trailing edge of said side of the valve at said side opening as the piston enters the valve and said trailing face to be contactingly followed by the leading edge of said side of the valve at said side opening as the piston leaves the valve.

4. In a rotary engine comprising an annular chamber, $n$ equidistantly spaced identical rotary valves subdividing said chamber, each said valve comprising a hollow, cylindrical, open-sided portion disposed in said chamber, $n+1$ piston members to traverse said chamber and pass successively into and out of said portion of each said valve in continuous sequence through said open sides thereof, means to rotate each said valve about its respective cylindrical axis $n+1$ times in the direction of rotation corresponding to the direction of travel of said piston members for each complete traverse of said chamber by each said piston, each said piston member having a trailing face shaped in accord with a portion of a curve mathematically expressed by $$x = R \cos \theta + r \cos n\theta$$
$$y = R \sin \theta - r \sin n\theta$$

where R is the distance from the axis of said annular chamber to one said valve axis, $r$ is the radius of each said valve, and the angle $\theta$ is measured from a selected $x$ axis which lies in the plane perpendicular to said chamber axis and includes said piston members, the width of said side opening and the length between said faces of each said piston member being proportioned to cause said leading face of each piston to be contactingly followed by the trailing edge of said side of the valve at said side opening as the piston enters the valve and said trailing face to be contactingly followed by the leading edge of said side of the valve at said side opening as the piston leaves the valve.

5. In a rotary engine, a disc flywheel, at least three like power pistons extending from a face of said flywheel equidistant from each other and from the rotative center of said flywheel and an equal number of compression pistons similarly arranged on the opposite face of said flywheel, a frame comprising an annular chamber for traversal by said power pistons and a second annular chamber for traversal by said compression pistons, a number of power side valves subdividing said first chamber into equal chamber segments, said number of valves being one less than the number of said power pistons, each said valve comprising a hollow cylindrical member extending from said first flywheel face across said first chamber and each having an open side to permit passage of said power pistons therethrough, a number of compression side valves equal in number to the number of power side valves and arranged in like manner across said compression chamber, means to rotate each said valve about its respective cylindrical axis in predetermined relation to rotation of said flywheel, and means to provide an explosive compressed mixture to said power side chamber segments, said means comprising conduit means connecting said power side chamber segments to the compression side chamber segments defined by said compression side valves, said flywheel having ports in cooperative relation to said conduit means and arranged to provide said explosive mixture through said ports at predetermined times with respect to the rotative position of said flywheel.

6. In a rotary internal combustion engine comprising a piston member, an annular chamber, said piston member being arranged to traverse said chamber and having a trailing face, a rotary valve having a chamber-sealing wall portion bounded by a forward edge arranged to travel across said chamber in a predetermined path, in a predetermined direction and at a predetermined rate relative to the rate of motion of said piston in said chamber, said trailing face being shaped for sealed contact continuously with said forward edge during the travel of said forward edge across said chamber, whereby a restricted cavity is defined behind said piston which increases in volume with forward motion of said piston, a restricted combustion chamber communicating with said annular chamber substantially at the area of first contact between said edge and face, explosion initiating means in said combustion chamber, port means to supply a compressed combustible mixture to said combustion chamber comprising port closing means arranged to close said combustion chamber simultaneously with the first contact of said edge and face, thereby to permit initiation of explosion at maximum compression of said mixture and thereafter to provide maximum utilization of the expansion due to said explosion to drive said piston.

References Cited in the file of this patent

UNITED STATES PATENTS

| | | |
|---|---|---|
| 805,552 | Vom Hofe | Nov. 28, 1905 |
| 1,174,431 | Miller | Mar. 7, 1916 |
| 1,239,694 | Jackman et al. | Sept. 11, 1917 |
| 1,261,927 | Harvey | Apr. 9, 1918 |
| 1,976,761 | Barels | Oct. 16, 1934 |
| 2,277,661 | Booth | Mar. 31, 1942 |

FOREIGN PATENTS

| | | |
|---|---|---|
| 812,870 | France | Feb. 15, 1937 |